United States Patent Office 3,278,587
Patented Oct. 11, 1966

3,278,587
17α-FLUORO, 17β-CHLOROFLUOROACETOXY AND 17β-METHYL - 5,10 - SECO-5,19-CYCLO-ANDROSTANE DERIVATIVES
Lawrence H. Knox, Mexico City, Mexico, assignor to Syntex Corporation, Panama, Panama, a corporation of Panama
No Drawing. Filed Mar. 19, 1964, Ser. No. 353,240
12 Claims. (Cl. 260—487)

The present invention relates to certain novel cyclopentanophenanthrene derivatives and to the method for making the same.

More particularly, the present invention relates to certain novel 17α-fluoro,17β-chlorofluoroacetoxy and 17β-methyl derivatives of the androstane series, represented by the following formulas:

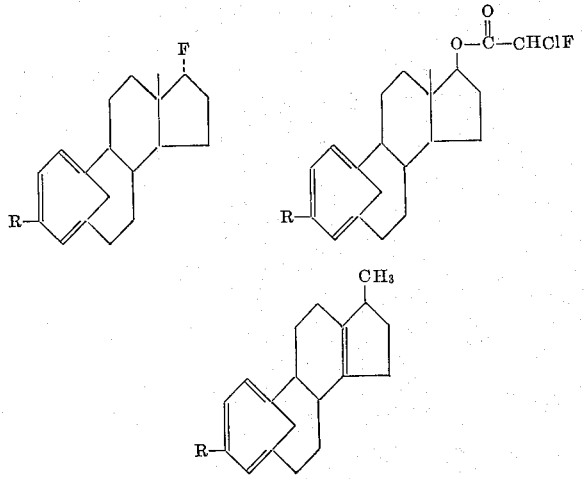

In the above formulas R represents hydrogen, a lower alkyl, alkenyl or alkinyl radical such as methyl, ethyl, propyl, vinyl, propenyl, ethinyl, propinyl, etc.

These compounds are anabolic-androgenic agents with a favorable anabolic-androgenic ratio. In addition, they have anti-estrogenic, anti-gonadotrophic and antifibrillatory properties, lower the blood cholesterol level and inhibit the activity of the pituitary gland.

The novel compounds are obtained by the method illustrated by the following equation:

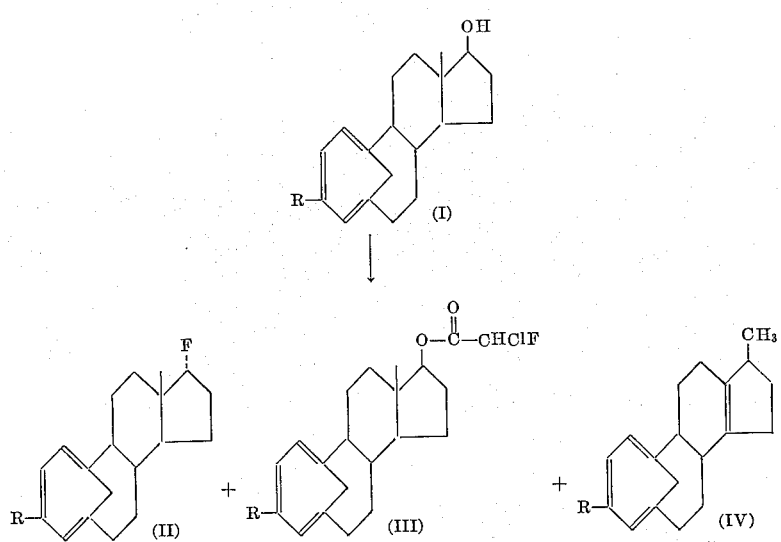

In the above formulas, R has the same meaning as heretofore set forth.

In practicing the process outlined above, a 3-alkyl, alkenyl or alkinyl substituted derivative of 5,10-seco-5,19-cyclo-$\Delta^{1(10),2,4}$-androstatrien-17β-ol-3-one (I) obtained by reaction of 5,10-methylene-19-nor-$\Delta^1$-androsten-17β-ol-3-one with a Grignard reagent, as described in my copending application Serial No. 346,096, filed February 20, 1964, is treated with 1 to 1.5 molar equivalents of a fluorinated amine such as 2-chloro-1,1,2-trifluorotriethylamine in a suitable organic solvent, at a temperature comprised between room temperature and the steam bath for a period of time of between 5 minutes to 3 hours. The solvent is then evaporated under reduced pressure, and the residue chromatographed on neutral alumina, thus producing the corresponding 17α-fluoro- (II) 17β-chlorofluoroacetoxy- (III) and 17β-methyl-$\Delta^{13}$- (IV) derivatives.

The solvent suitable for the reaction are acetonitrile, ethers such as diethyl ether, isopropyl ether, dioxane, tetrahydrofuran, Dowanol and the like, aromatic hydrocarbons such as benzene, toluene, xylene, etc. In general, the reaction can be carried out in any organic solvent without acidic hydrogen.

Examples of suitable starting materials for the process of the present invention are:

3-methyl-5,10-seco-5,19-cyclo-$\Delta^{1(10),2,4}$-androstatrien-17β-ol,
3-ethyl-5,10-seco-5,19-cyclo-$\Delta^{1(10),2,4}$-androstatrien-17β-ol,
3-propyl-5,10-seco-5,19-cyclo-$\Delta^{1(10),2,4}$-androstatrien-17β-ol,
3-vinyl-5,10-seco-5,19-cyclo-$\Delta^{1(10),2,4}$-androstatrien-17β-ol,
3-propenyl-5,10-seco-5,19-cyclo-$\Delta^{1(10),2,4}$-androstatrien-17β-ol,
3-ethinyl-5,10-seco-5,19-cyclo-$\Delta^{1(10),2,4}$-androstatrien-17β-ol, and
3-propinyl-5,10-seco-5,19-cyclo-$\Delta^{1(10),2,4}$-androstatrien-17β-ol.

The following examples serve to illustrate but are not intended to limit the scope of the present invention:

*Example I*

To a solution of 2 g. of 3-methyl-5,10-seco-5,19-cyclo-$\Delta^{1(10),2,4}$-androstatrien-17β-ol in 30 cc. of anhydroustetrahydrofuran there was added 2 g. (1.5 molar equivalents) of 2-chloro-1,1,2-trifluorotriethylamine and the reaction mixture refluxed for 20 minutes, under anhydrous conditions. It was then evaporated to dryness under reduced pressure and the residue chromatographed on 100 g. of Florisil, to produce 3-methyl-17α-fluoro-5,10-seco-5,19-cyclo-Δ$^{1(10),2,4}$-androstatriene, 3-methyl-17β-chlorofluoroacetoxy-5,10-seco-5,19-cyclo-Δ$^{1(10),2,4}$-androstatriene and 3,17β - dimethyl - 5,10-seco-5,19-cyclo-18-nor-Δ$^{1(10),2,4,13}$-androstatetraene in pure form.

Example II

To a solution of 2.5 g. of 3-methyl-5,10-seco-5,19-cyclo-Δ$^{1(10),2,4}$-androstatrien-17β-ol in 20 cc. of anhydrous acetonitrile there was added 1.1 molar equivalents of 2-chloro-1,1,2-trifluorotriethylamine, and the reaction mixture was then heated on the steam bath for 15 minutes. The solvent was then evaporated to dryness under vacuo and the residue chromatographed on 125 g. of neutral alumina, thus producing 3-methyl-17α-fluoro-5,10-seco-5,19-cyclo-Δ$^{1(10),2,4}$-androstatriene, 3-methyl-17β-chlorofluoroacetoxy-5,10-seco-5,19-cyclo-Δ$^{1(10),2,4}$-androstatriene and 3,17β - dimethyl - 5,10 - seco - 5,19 - cyclo-18-nor-Δ$^{1(10),2,4,13}$-androstatetraene identical to those obtained in the preceding example.

By the same method, 3-ethyl-5,10-seco-5,19-cyclo-Δ$^{1(10),2,4}$-androstatrien-17β-ol and 3-vinyl-5,10-seco-5,19-cyclo-Δ$^{1(10),2,4}$-androstatrien-17β-ol were converted respectively into 3-ethyl-17α-fluoro-5,10-seco-5,19-cyclo-Δ$^{1(10),2,4}$-androstatriene, 3-ethyl-17β-chlorofluoroacetoxy-5,10-seco-5,19-cyclo-Δ$^{1(10),2,4}$-androstatriene and 3-ethyl-17β - methyl - 5,10-seco-5,19-cyclo-18-nor-Δ$^{1(10),2,4,13}$-androstatetraene and 3-vinyl-17α-fluoro-5,10-seco-5,19-cyclo-Δ$^{1(10),2,4}$-androstatriene, 3-vinyl-17β - chlorofluoroacetoxy-5,10-seco-5,19-cyclo-Δ$^{1(10),2,4}$-androstatriene and 3-vinyl - 17β - methyl - 5,10 - seco - 5,19 - cyclo - 18-nor-Δ$^{1(10),2,4,13}$-androstatetraene.

Example III

Example I was repeated but instead of heating, the reaction mixture was allowed to stand at room temperature for 3 hours, with the same results.

Example IV

In accordance with the method of Example I, the compounds mentioned below under I were converted into the products set forth under II, which were separated by chromatography on Florisil.

| I | II |
|---|---|
| 3-propyl-5,10-seco-5,19-cyclo-Δ$^{1(10),2,4}$-androstatrien-17β-ol. | 3-propyl-17α-fluoro-5,10-seco-5,19-cyclo-Δ$^{1(10),2,4}$-androstatriene, 3-propyl-17β-chlorofluoroacetoxy-5,10-seco-5,19-cyclo-Δ$^{1(10),2,4}$-androstatriene and 3-propyl-17β-methyl-5,10-seco-5,19-cyclo-18-nor-Δ$^{1(10),2,4,13}$-androstatetraene. |
| 3-propenyl-5,10-seco-5,19-cyclo-Δ$^{1(10),2,4}$-androstatrien-17β-ol. | 3-propenyl-17α-fluoro-5,10-seco-5,19-cyclo-Δ$^{1(10),2,4}$-androstatriene, 3-propenyl-17β-chlorofluoroacetoxy-5,10-seco-5,19-cyclo-Δ$^{1(10),2,4}$-androstatriene and 3-propenyl-17β-methyl-5,10-seco-5,19-cyclo-18-nor-Δ$^{1(10),2,4,13}$-androstatetraene. |
| 3-ethinyl-5,10-seco-5,19-cyclo-Δ$^{1(10),2,4}$-androstatrien-17β-ol. | 3-ethinyl-17α-fluoro-5,10-seco-5,19-cyclo-Δ$^{1(10),2,4}$-androstatriene, 3-ethinyl-17β-chlorofluoroacetoxy-5,10-seco-5,19-cyclo-Δ$^{1(10),2,4}$-androstatriene and 3-ethinyl-17β-methyl-5,10-seco-5,19-cyclo-18-nor-Δ$^{1(10),2,4,13}$-androstatetraene. |
| 3-propinyl-5,10-seco-5,19-cyclo-Δ$^{1(10),2,4}$-androstatrien-17β-ol. | 3-propinyl-17α-fluoro-5,10-seco-5,19-cyclo-Δ$^{1(10),2,4}$-androstatriene, 3-propinyl-17β-chlorofluoroacetoxy-5,10-seco-5,19-cyclo-Δ$^{1(10),2,4}$-androstatriene and 3-propinyl-17β-methyl-5,10-seco-5,19-cyclo-18-nor-Δ$^{1(10),2,4,13}$-androstatetraene. |

I claim:
1. A compound of the following formula:

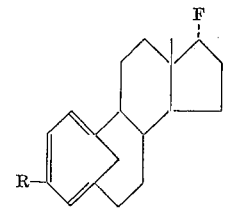

wherein R is selected from the group consisting of lower alkyl, lower alkenyl and lower alkinyl.

2. 3 - methyl-17α-fluoro-5,10-seco-5,19-cyclo-Δ$^{1(10),2,4}$-androstatriene.

3. 3 - vinyl - 17α-fluoro-5,10-seco-5,19-cyclo-Δ$^{1(10),2,4}$-androstatriene.

4. 3 - ethinyl-17α-fluoro-5,10-seco-5,19-cyclo-Δ$^{1(10),2,4}$-androstatriene.

5. A compound of the following formula:

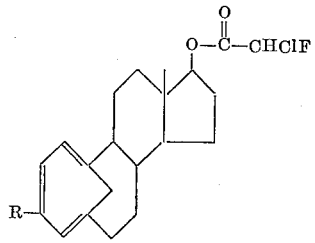

wherein R is selected from the group consisting of lower alkyl, lower alkenyl and lower alkinyl.

6. 3 - methyl - 17β-chlorofluoroacetoxy-5,10-seco-5,19-cyclo-Δ$^{1(10),2,4}$-androstatriene.

7. 3 - vinyl-17β-chlorofluoroacetoxy-5,10-seco-5,19-cyclo-Δ$^{1(10),2,4}$-androstatriene.

8. 3 - ethinyl - 17β - chlorofluoroacetoxy-5,10-seco-5,19-cyclo-Δ$^{1(10),2,4}$-androstatriene.

9. A compound of the following formula:

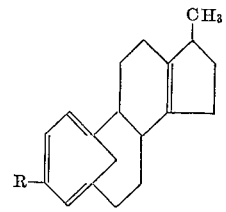

wherein R is selected from the group consisting of lower alkyl, lower alkenyl and lower alkinyl.

10. 3,17β - dimethyl - 5,10 - seco - 5,19 - cyclo-18-nor-Δ$^{1(10),2,4,13}$-androstatetraene.

11. 3 - vinyl - 17β - methyl - 5,10 - seco - 5,19 - cyclo-18-nor-Δ$^{1(10),2,4,13}$-androstatetraene.

12. 3 - ethinyl - 17β - methyl - 5,10 - seco - 5,19 - cyclo-18-nor-Δ$^{1(10),2,4,13}$-androstatetraene.

No references cited.

LORRAINE A. WEINBERGER, *Primary Examiner.*

A. P. HALLUIN, *Assistant Examiner.*